US00RE45925E

(19) United States
(12) Reissued Patent
Tojo

(10) Patent Number: US RE45,925 E
(45) Date of Reissued Patent: Mar. 15, 2016

(54) FLAT PANEL DISPLAY MODULE HAVING SPEAKER FUNCTION

(75) Inventor: Makoto Tojo, Kodaira (JP)

(73) Assignee: CASIO COMPUTER CO., LTD., Tokyo (JP)

(21) Appl. No.: 13/184,317

(22) Filed: Jul. 15, 2011

Related U.S. Patent Documents

Reissue of:
(64) Patent No.: 7,565,949
Issued: Jul. 28, 2009
Appl. No.: 11/526,394
Filed: Sep. 25, 2006

(30) Foreign Application Priority Data

Sep. 27, 2005 (JP) ..... 2005-279802

(51) Int. Cl.
*A47B 81/06* (2006.01)
*G06F 1/00* (2006.01)

(52) U.S. Cl.
CPC ..... *G06F 1/00* (2013.01)

(58) Field of Classification Search
CPC ..... H04R 1/00; H04R 1/02; H04R 1/1058; H04R 3/00; H04B 1/04; H04B 1/40; H04B 1/385; H04B 1/3833; G01V 1/30; G01V 1/38; G01V 1/3808
USPC ..... 181/199, 198, 148, 171; 455/550.1, 455/90.3, 566; 381/333, 334, 335, 336, 381/337, 338, 339, 351, 386, 387, 388
See application file for complete search history.

(56) References Cited

U.S. PATENT DOCUMENTS

| | | | | | |
|---|---|---|---|---|---|
| 4,177,873 | A * | 12/1979 | Ripple | 181/148 |
| 4,352,961 | A * | 10/1982 | Kumada et al. | 455/350 |
| 4,860,369 | A * | 8/1989 | Koshimura et al. | 381/395 |
| 5,416,463 | A * | 5/1995 | Higgins et al. | 340/384.73 |
| 5,425,002 | A * | 6/1995 | Plisek et al. | 367/175 |
| 5,590,208 | A * | 12/1996 | Koyano et al. | 381/338 |
| 5,606,623 | A * | 2/1997 | Bahm et al. | 381/86 |
| 5,670,932 | A * | 9/1997 | Kizima | 340/384.6 |
| 5,868,475 | A * | 2/1999 | Shikata et al. | 312/7.2 |
| 6,208,238 | B1 * | 3/2001 | Ohta | 340/391.1 |
| 6,265,965 | B1 * | 7/2001 | Lee | 340/388.1 |
| 6,304,435 | B1 * | 10/2001 | Hsu | 361/679.23 |
| 6,427,017 | B1 * | 7/2002 | Toki | 381/190 |
| 6,484,843 | B2 * | 11/2002 | Yoshii et al. | 181/153 |
| 6,522,755 | B1 * | 2/2003 | Warnaka et al. | 381/86 |
| 6,522,759 | B1 * | 2/2003 | Mori | 381/150 |

(Continued)

FOREIGN PATENT DOCUMENTS

| | | |
|---|---|---|
| EM | 1 257 147 A2 | 11/2002 |
| JP | 62-231847 A | 10/1987 |

(Continued)

OTHER PUBLICATIONS

Japanese Office Action dated Mar. 31, 2009 (2 pages), and English translation thereof (3 pages), issued in counterpart Japanese Application Serial No. 2006-261602.

*Primary Examiner* — Nick Corsaro
(74) *Attorney, Agent, or Firm* — Holtz, Holtz & Volek PC

(57) ABSTRACT

An image display module include a flat panel display, a sound source element disposed on a rear surface side opposite to a display observation side of the panel display, and a sound leading path through which a sound wave generated from the sound source element is led to the display observation side.

37 Claims, 5 Drawing Sheets

(56) References Cited

U.S. PATENT DOCUMENTS

| | | | | |
|---|---|---|---|---|
| 6,708,797 | B2 * | 3/2004 | Long et al. | 181/149 |
| 6,789,642 | B1 * | 9/2004 | Long et al. | 181/149 |
| 6,834,744 | B2 * | 12/2004 | Toki | 181/148 |
| 6,907,955 | B2 * | 6/2005 | Masuda | 181/148 |
| 6,912,288 | B2 * | 6/2005 | Nakashima et al. | 381/190 |
| 6,918,461 | B2 * | 7/2005 | Christie | 181/148 |
| 6,942,060 | B2 * | 9/2005 | Sugiura et al. | 181/199 |
| 6,954,971 | B1 * | 10/2005 | Bryant et al. | 29/25.35 |
| 6,964,318 | B2 * | 11/2005 | Sugiura et al. | 181/199 |
| 7,050,600 | B2 * | 5/2006 | Saiki et al. | 381/388 |
| 7,076,078 | B2 * | 7/2006 | Peng | 381/388 |
| 7,106,878 | B2 * | 9/2006 | Saiki et al. | 381/396 |
| 7,110,561 | B2 * | 9/2006 | Kam | 381/152 |
| 7,151,837 | B2 * | 12/2006 | Bank et al. | 381/190 |
| 7,316,289 | B2 * | 1/2008 | Ajiki et al. | 181/171 |
| 7,382,890 | B2 * | 6/2008 | Saiki et al. | 381/152 |
| 7,385,482 | B2 * | 6/2008 | Wada | 340/384.1 |
| 2001/0028303 | A1 * | 10/2001 | Kuwabara et al. | 340/384.1 |
| 2002/0034314 | A1 * | 3/2002 | Colloms et al. | 381/353 |
| 2002/0164044 | A1 * | 11/2002 | Long et al. | 381/388 |
| 2003/0003945 | A1 * | 1/2003 | Saiki et al. | 455/550 |
| 2003/0202673 | A1 * | 10/2003 | Tajima et al. | 381/386 |
| 2004/0081329 | A1 * | 4/2004 | Huang et al. | 381/334 |
| 2004/0084242 | A1 * | 5/2004 | Masuda | 181/148 |
| 2005/0025330 | A1 * | 2/2005 | Saiki et al. | 381/388 |
| 2005/0129261 | A1 | 6/2005 | Ito et al. | |
| 2005/0129267 | A1 * | 6/2005 | Azima et al. | 381/431 |
| 2005/0152564 | A1 * | 7/2005 | Harris et al. | 381/152 |
| 2005/0180592 | A1 * | 8/2005 | Miura | 381/401 |
| 2005/0205350 | A1 * | 9/2005 | Yang | 181/160 |
| 2006/0037807 | A1 * | 2/2006 | Hongo et al. | 181/199 |
| 2006/0039575 | A1 * | 2/2006 | Wada | 381/152 |
| 2006/0210099 | A1 * | 9/2006 | Takahata et al. | 381/152 |
| 2006/0215865 | A1 * | 9/2006 | Kang et al. | 381/333 |
| 2006/0245613 | A1 * | 11/2006 | Itoh et al. | 381/388 |
| 2006/0270459 | A1 | 11/2006 | Lee et al. | 455/565 |
| 2007/0025582 | A1 * | 2/2007 | Rashish et al. | 381/388 |
| 2007/0030985 | A1 * | 2/2007 | Cheung | 381/152 |
| 2007/0071259 | A1 * | 3/2007 | Tojo | 381/152 |
| 2007/0116321 | A1 * | 5/2007 | Jang et al. | 381/388 |
| 2007/0147648 | A1 * | 6/2007 | Koizumi et al. | 381/386 |
| 2008/0146265 | A1 * | 6/2008 | Valavi | 455/550.1 |
| 2008/0149418 | A1 * | 6/2008 | Imamura et al. | 181/199 |

FOREIGN PATENT DOCUMENTS

| | | | | |
|---|---|---|---|---|
| JP | 2001156899 | A | * | 6/2001 |
| JP | 2005-117201 | A | | 4/2005 |
| JP | 2006-333474 | A | | 12/2006 |
| WO | WO 2004/004408 | | | 1/2004 |

* cited by examiner

FLAT PANEL DISPLAY MODULE HAVING SPEAKER FUNCTION

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application is based upon and claims the benefit of priority from prior Japanese Patent Application No. 2005-279802, filed Sep. 27, 2005, the entire contents of which are incorporated herein by reference.

BACKGROUND OF THE INVENTION

1. Field of the Invention

The present invention relates to a flat panel display module having a speaker function.

2. Description of the Related Art

In recent years, as a display for a mobile device such as a mobile phone, a flat panel display (which will be referred to as an FPD hereinafter) such as a liquid crystal display or an organic electroluminescent (EL) display suitable for a reduction in size and thickness has been often used.

A mobile phone has been advancing from a simple telephone to a composite device provided with functions as a television or a personal digital assistant (PDA), and a display used in such a mobile device is demanded to not only display a picture or image but also be provided with a speaker function which outputs sound.

As an example of an FDP for a mobile device provided with a speaker, an in-car liquid crystal display panel as disclosed in Jpn. Pat. Appln. KOKAI Publication No. 231847-1987 is known.

In the in-car liquid crystal display panel, an image display and a speaker are aligned on a front surface of a device. When the speaker is aligned with the picture display on the front surface of the device in this manner, a front area of the entire device is increased, this increase is against a demand for a reduction in size, and this display is not suitable as a display for a mobile device which requires a reduction in thickness and size.

BRIEF SUMMARY OF THE INVENTION

It is an object of the present invention to provide a flat panel display module with a speaker mechanism which has been reduced in size and thickness.

According to a flat panel display module according to a first aspect of the present invention, there is provided a flat panel display module comprising:

a flat panel display;

a sound source element disposed on a rear surface side opposite to a display observation side of the panel display; and a sound leading path through which a sound wave generated from the sound source element is led to the display observation side.

In this flat panel display module, it is preferable to further comprise a case in which the panel display and the sound source element are accommodated and forms the sound leading path by using a space surrounded by the outer side surface of the panel display and the corresponding sidewall of the case. In this case, it is desirable that a protruding portion which is separated from the side surface of the panel display is formed on the sidewall of the case and a space surrounded by the outer side surface of the panel display and an inner surface of protruding portion forms the sound leading path.

In this image display module, it is preferable to further comprise: a backlight unit which is arranged between the panel display and the sound source element and illuminates the panel display; and a case which accommodates the panel display, the backlight unit and the sound source element, and forms the sound leading path by using a space surrounded by the outer side surface of the panel display, an outer side surface of the backlight unit and the corresponding sidewall of the case. In this case, it is desirable that a protruding portion which protrudes from the side surface of the panel display is formed on the sidewall of the case and a space surrounded by the side surface of the panel display, the side surface of the backlight unit and the protruding portion forms the sound leading path. It is more desirable that the protruding portion formed on the sidewall of the case is constituted of a protruding wall which forms an elongated rectangular space bulging along the side surface of the panel display.

In this image display module, it is preferable that a case which accommodates the panel display and the sound source element is further provided, and the sound source element is formed of a vibration element which vibrates in response to a sound signal supplied thereto and arranged between the panel display and the case on a rear side with both circumferential surfaces of this vibration element being held by spacers. In this case, it is desirable that at least one of the spacers arranged between the sound source element and the rear side of the panel display and between the sound source element and the case has a notched portion which allows a space formed between the sound source element and the panel display side and between the sound source element and the case by the spacers to communicate with the sound leading path.

In this image display module, it is preferable that a backlight unit which is arranged between the panel display and the sound source element and illustrates the panel display and a case which accommodates the panel display, the backlight unit and the sound source element are further provided, and the sound source element is constituted of a vibration element which vibrates in response to a sound signal supplied thereto and arranged between the backlight unit on the rear side apart from the panel display and the case with both circumferential surfaces of this vibration element being held by spacers. In this case, it is desirable that at least one of the spacers respectively arranged between the sound source element and the backlight unit and between the sound source element and the case has a notched portion which allows a space formed between the sound source element and the backlight unit or the case by the spacers to communicate with the sound leading path.

In this image display module, it is preferable that the sound source element is a piezoelectric vibrator having a pair of electrodes which are electrically conductive and disposed on both surfaces of a piezoelectric element which vibrates in accordance with an applied voltage. Alternatively, the sound source element may be constituted of a vibration plate, a piezoelectric element which is provided on at least one surface of this vibration plate and vibrates in accordance with an applied voltage, and a pair of electrodes which are electrically conductive and connected on both surfaces of this piezoelectric element. In this case, it is preferable to further comprise a case which accommodates the panel display and the sound source element, and a spacer which supports the vibration plate of the sound source element in the case. Furthermore, it is preferable that a flexible wiring board which has a wiring pattern formed on a flexible base film surface consisting of an insulating resin material and supplies a signal voltage to the sound source element is further provided and the flexible wiring board is arranged with a rear surface of the base film facing an inner surface of the case.

Moreover, in the image display module, it is preferable that the panel display is a liquid crystal display panel having a liquid crystal held between a pair of substrates.

According to a flat panel display module based on a second aspect of the present invention, there is provided a flat panel display module comprising:

a flat panel display;

a backlight unit which is disposed on a rear surface side opposite to a display observation side of the panel display and illuminates the panel display;

a sound source element arranged on a rear surface side of the backlight unit;

a case which accommodates the panel display, the backlight unit and the sound source element; and a sound leading path which is formed of a space surrounded by a side surface of the panel display, a side surface of the backlight unit and a corresponding sidewall of the case and leads a sound wave generated from the sound source element to the display observation side.

In this image display module, it is preferable that a protruding wall which protrudes along a side surface of the panel display and forms an elongated rectangular space is formed on a sidewall of the case and a space surrounded by the side surface of the panel display, a side surface of the backlight unit and the protruding wall forms the sound leading path. In this case, it is desirable that the sound source element is constituted of a vibration element which vibrates in response to a sound signal supplied thereto, a first spacer which is arranged along a circumference of the vibration element and constituted of an elastic body having a notched portion which allows communication with the sound leading path is provided between the vibration element and the backlight unit, and a second spacer which is arranged along the circumference of the vibration element and supports the vibration element in the case is provided between the vibration element and the case.

According to a flat panel display module based on a third aspect of the present invention, there is provided a flat panel display module comprising:

a flat panel display;

a plurality of sound source elements which are disposed on a rear surface side opposite to a display observation side of the panel display; and a plurality of sound leading paths which respectively lead sound waves generated from the sound source elements to the display observation side.

In this case, it is preferable to further comprise: a backlight unit which is arranged between the panel display and the sound source element and illuminates the panel display; a case which respectively accommodates the panel display, the backlight unit and the two sound elements at positions adjacent to opposed sides of the panel display, has two protruding walls which protrude along the side surfaces of the panel display to form protruding elongated rectangular spaces being formed on two opposed sidewalls to which the respective sound source elements are adjacent, and forms the two sound leading paths by using spaces surrounded by the two opposed side surfaces of the panel display, two opposed side surfaces of the backlight unit and the two sidewalls of the case; two first spacers each of which is arranged along a circumference of each sound source element between each of the two sound source elements and the backlight unit and formed of an elastic body having a notched portion which allows communication with each sound leading path; and two second spacers each of which is arranged along a circumference of each sound source element between each of the two sound source elements and the case and supports each sound source element in the case.

According to the flat panel display module based on the first aspect of the present invention, since the sound source element is disposed on the rear surface side of the display and the sound leading path which leads a sound wave generated by the sound source element to a front surface side which is an observation side of display is provided, a spacer including the sound source element does not have to be aligned with a display on a front surface of a device (a surface on the observation side), the entire device can be reduced in area and thickness, and this module can be applied to a device such as a mobile phone.

Additionally, since the flat panel display module according to the present invention further comprises the case which accommodates the panel display and the sound source element and the sound leading path is formed of the space surrounded by the side surface of the flat panel display and the corresponding sidewall of the case, a dedicated member which constitutes the sound leading path is not necessary, and the structure of the image display module including the speaker can be simplified without increasing the number of components, thereby enabling manufacture at low cost.

Further, in the flat panel display module according to the present invention, since the sound source element is arranged between the display and the case which accommodates the sound source element through the spacers which hold a rim portion of the sound source element, vibration of the sound source element is not propagated to the panel display, and a display failure does not occur.

Furthermore, when the elastic spacers are provided, at least one of the spacers arranged between the sound source element and the panel display and between the sound source element and the case has the notched portion which allows the space formed between the sound source element and the panel display or the case by the spacers to communicate with the sound leading path, and hence a sound wave generated from the sound source element can be led to the sound leading path without damping, thus obtaining clear sounds.

Moreover, the present invention comprises a wiring member which supplies a signal voltage to the sound source element as a flexible wiring board having a wiring pattern formed on a flexible base film surface consisting of an insulating resin material, and the flexible wiring board is arranged with a rear surface of the base film facing an inner surface of the accommodation case, thereby preventing a wiring line exposed portion of the flexible wiring board from being short-circuited when the accommodation case is formed of an electric conductor.

According to the image display module based on the second aspect of the present invention, there are provided the panel display, the backlight unit, the sound source element and the case accommodating these members and the sound leading path is formed between the panel display, the side surface of the backlight and the case, thereby obtaining the image display module with the speaker which has a simple structure and can be reduced in size and thickness.

According to the image display module based on the third aspect of the present invention, since the two sound source elements are arranged on the rear side of the panel display and two sound waves generated by these two sound source elements are led to the front surface of the panel display for sound generation through the two different sound leading paths, a stereophonic effect can be obtained by using these two sound elements.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
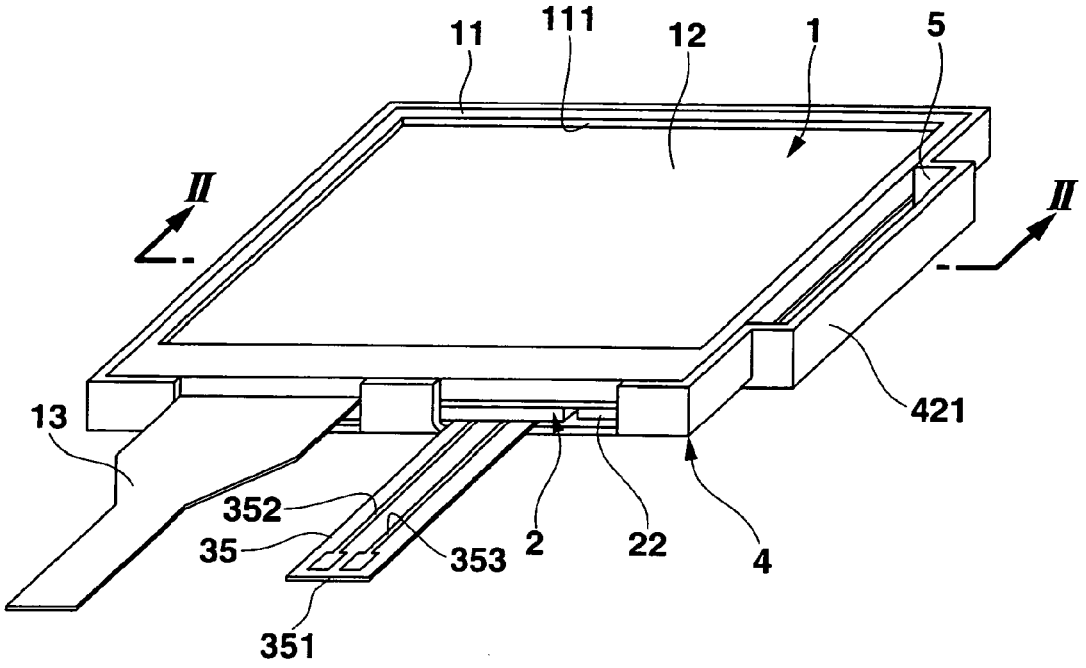
FIG. 1 is a perspective view showing a liquid crystal display module as a first embodiment according to the present invention.
Figure 2:
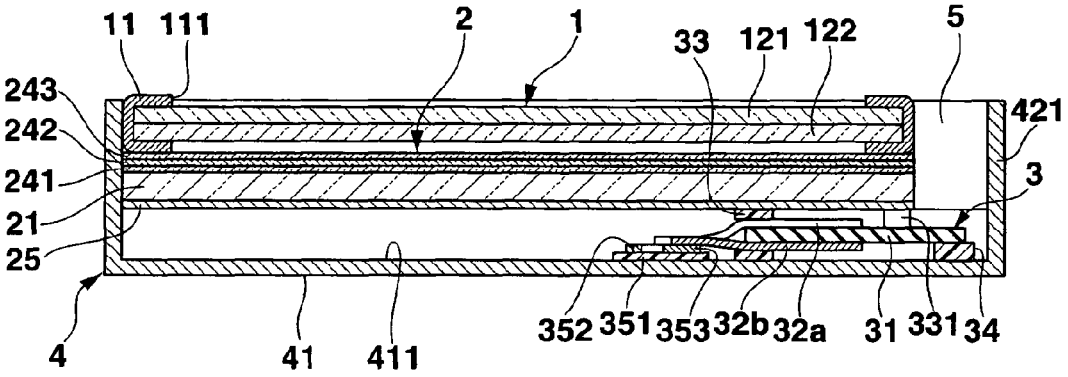
FIG. 2 is a cross-sectional view showing the liquid crystal display module taken along a line II-II in FIG. 1.
Figure 3:
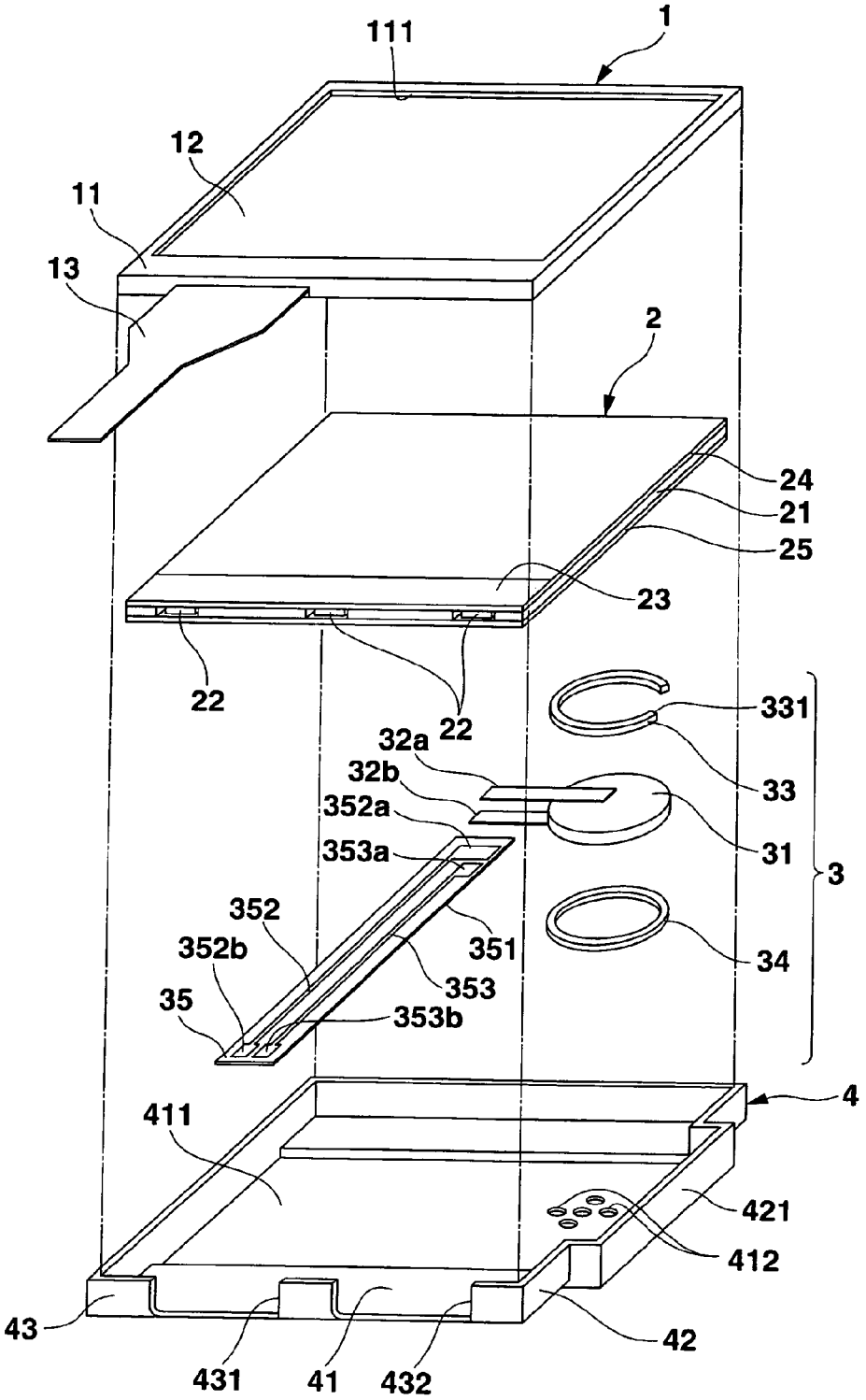
FIG. 3 is an exploded perspective view of the liquid crystal display module.

FIG. 1 is a perspective view showing a liquid crystal display module as a first embodiment according to the present invention, FIG. 2 is a cross-sectional view taken along a line II-II in FIG. 1, and FIG. 3 is an exploded perspective view of the display module.

As shown in FIG. 3, a liquid crystal display module according to this embodiment is mainly constituted of a liquid crystal display unit 1, a backlight unit 2, a sound source unit 3 and an external case 4. The liquid crystal display unit 1 is formed of a panel case 11 and a liquid crystal display panel 12 accommodated in the panel case 11. As shown in FIG. 2, the liquid crystal display panel 12 is constituted by bonding a pair of rectangular glass substrates 121 and 122 respectively having non-illustrated electrodes formed on the opposite surface thereof with a predetermined gap interposed therebetween by using a non-illustrated frame-like sealing member in such a manner that the opposite surfaces face each other and inserting a non-illustrated liquid crystal between the glass substrates 121 and 122 surrounded by the frame-like sealing member. A window through which the display is observed is formed in a front surface of the panel case 11. A flexible wiring board 13 (see FIG. 1) which supplies a control signal voltage which drives the liquid crystal from an external drive control circuit is connected with the liquid crystal display panel 12.

The backlight unit 2 is disposed on a rear surface side which is opposite to a display observation side of the liquid crystal display unit 1. As shown in FIG. 3, the backlight unit 2 is constituted of a light guide plate 21 formed of a substantially transparent rectangular plate, light-emitting diodes (LEDs) 22 as a plurality of point light source elements which face and are arranged on one end surface (a light incidence end surface) of the light guide plate 21, a circuit board 23 on which a feeder wiring circuit for the LEDs 22 is formed, an optical sheet laminated body 24 laminated and arranged on an light exit surface (a front surface facing the liquid crystal display panel 12) of the light guide plate 21, a light reflection sheet 25 arranged on a rear surface of the light guide plate 21 and others. In this embodiment, the three LEDs 22 uniformly face and are arranged on the light incidence end surface of the light guide plate 21. These three LEDs 22 are directly mounted on the circuit board 23. As shown in FIG. 2, the optical sheet laminated body 24 is constituted by sequentially laminating and arranging two prism sheets 241 and 242 which align light exit directions and a light diffusion sheet 243 on the light exit surface of the light guide plate 21.

The sound source unit 3 as a sound source assembly is installed on the rear surface side of the backlight unit 2. The sound source unit 3 is provided with a piezoelectric vibration element constituting a vibration element, which is specifically constituted of a discoid piezoelectric ceramic plate 31. The unit 3 further includes a pair of strip-like thin-film electrodes 32a and 32b which are respectively electrically conductive and attached on opposite surfaces of the piezoelectric ceramic plate 31, a first spacer 33 of a C-shaped ring (which will be referred to as a C-shaped spacer hereinafter) which is interposed between the piezoelectric ceramic plate 31 and the backlight unit 2 and has a notch or an opening portion 331 formed therein, a second spacer 34 of a circular ring shape (which will be referred to as a circular spacer hereinafter) which is interposed between the piezoelectric ceramic plate 31 and the external case 4, and a sound source signal input flexible wiring board 35. The wiring board 35 has a wiring line which applies a sound source signal voltage to the piezoelectric ceramic plate 31 through the thin-film electrodes 32a and 32b formed thereon.

Here, each of the C-shaped spacer 33 and the circular spacer 34 is formed of a buffer material such as polyurethane foam, is in contact with and holds a rim portion of the piezoelectric ceramic plate 31, and is interposed to obtain the following first to third functions and effects.

Firstly, each spacer functions as a spacer which assures a sufficient gap which is larger than an amplitude when the piezoelectric ceramic plate 31 vibrates, and supports this plate, thereby demonstrating an effect of freely vibrating the piezoelectric ceramic plate 31 with a large amplitude. Therefore, the respective spacers 33 and 34 are formed into sizes allowing the rim portions of the piezoelectric ceramic plate 31 to be supported on both sides.

Secondly, each spacer functions as a buffer material which prevents vibrations of the piezoelectric ceramic plate 31 from being transmitted to other members. In case of such a liquid crystal display module as described in this embodiment in particular, each spacer demonstrates an effect of avoiding occurrence of a display failure when vibrations are transmitted to the liquid crystal display panel 12.

Further, thirdly, each spacer functions as a barrier which avoids interference between sound waves generated from both surfaces of the piezoelectric ceramic plate 31 when it vibrates, and forms a sound leading path. That is, the circular spacer 34 disposed on the rear surface (the surface facing the external case 4) of the piezoelectric ceramic plate 31 is formed into a closed circular ring shape which covers the entire circumference of the rear surface of the piezoelectric ceramic plate 31, prevents a sound wave generated from the rear surface of the piezoelectric ceramic plate 31 from being propagated toward the surface facing the backlight unit 2 and discharges the sound wave toward the rear surface side. The first spacer 33 disposed on the front surface of the piezoelectric ceramic plate 31 is formed into a "C-like ring" shape having the opening or cutting portion 331 obtained by partially notching a circular ring, and disposed in such a manner that its opening portion 331 faces a direction along which a sound wave generated from the front surface of the piezoelectric ceramic plate 31 should be propagated. As will be described later, the opening portion 331 of the C-shaped spacer 33 communicates with a sound leading path constituted of a space (a part of a sound leading path 5 which is described later) formed between a part of an outer side surface of the panel display unit 1 and a part of an inner side surface of the external case 4. A sound wave generated from the front surface of the piezoelectric ceramic plate 31 is thereby discharged from the opening portion 331 to the sound leading path 5 without interfering with a sound wave generated from the rear surface of the plate 31, thus obtaining a clear sound.

The sound source signal input flexible wiring board 35 has an insulating resin film formed of, e.g., a polyimide film as a base film 351. Two wiring lines 352 and 353 are formed on one surface of the base film 351 by patterning a copper foil based on photolithography. As shown in FIG. 3, connection terminals 352a and 352b and connection terminals 353a and 353b are formed at both ends of the respective wiring lines 352 and 353. The other end portion of each of the pair of thin-film electrodes 32a and 32b whose one end portion is electrically conductive and attached to each of both surfaces of the piezoelectric ceramic plate 31 is soldered and joined to each connection terminal 352a and 353a of the wiring line 352 and 353 on one side. The flexible wiring elongate board 35 is disposed on the rear surface side of the backlight unit 2 in such a manner that its wiring line formed surface faces this unit 2.

The liquid crystal display unit 1, the backlight unit 2 and the sound source unit 3 are accommodated in the external case 4 as shown in FIG. 2. The external case 4 according to this embodiment is obtained by processing a sheet metal material, constituted of two short sidewalls 42, two long sidewalls 43 and a bottom plate 41. Thus, the case 4 is formed into a rectangular box shape with an opened upper surface having a flat outer shape in which the liquid crystal display unit 1 and the backlight unit 2 can be fitted and accommodated. An elongate rectangular concave portion 411 extended over an entire length in a longitudinal direction is formed at a central part of the bottom plate 41 of this external case 4. The sound source unit 3 is accommodated and attached in this concave portion 411. A plurality of, for example, five narrow through holes 412 are cruciately formed in the concave portion 411 in this embodiment. These narrow or small holes 412 are formed in an area facing the piezoelectric ceramic plate 31 of the attached sound source unit 3 to be positioned within the ring spacer 34, and provided in order to rapidly dissipate an unnecessary sound wave generated from the rear surface of the piezoelectric ceramic plate 31 toward the outside of the external case 4. According to such a structure, an unnecessary sound wave can be dissipated, absorbed and attenuated in a space outside the external case 4 (an excessive space of the present module installation space in an applied device). As a result, sound generated from the sound source unit 3 becomes more clear.

A protruding portion 421 which is bent into a U-like shape and protrudes toward the outside from the side surface of the panel display and forms a sound leading path therein, which leads a sound wave is formed at a part of one of the short sidewalls 42 positioned in the longitudinal direction corresponding to the concave portion 411 in the external case 4. The protruding portion 421 serves as a protruding wall which forms an elongated rectangular space which bulges along the side surface of the panel display.

The opening space 331 of the C-shaped spacer 33 in the sound source unit 3 is opened toward the space of the protruding portion 421 on the sidewall 42.

Two openings or cut-out portions 431 and 432 each having a predetermined length are formed on one of the pair of sidewalls 43 extending in the longitudinal direction. The openings 431 and 432 are rectangular openings through which the flexible wiring board 13 bonded to the liquid crystal display panel 11 and the sound source signal input flexible wiring board 35 of the sound source unit 3 are extended toward the outside of the external case 4.

As shown in FIG. 2, the sound source unit 3 is attached to the thus formed external case 4. In this case, a surface or a lower side of the sound source signal input flexible wiring board 35 on which the wiring lines 352 and 353 on the base film 351 are not formed is arranged to face the bottom plate 41 of the external case 4. As a result, the non-insulated connection terminals 352a and 353a or the like of the wiring lines 352 and 353 are suppressed from leaking to the external case 4 formed of a sheet metal material as a conductor, and the connection terminals 352a and 353a can be prevented from being short-circuited. The backlight unit 2 and the liquid crystal display unit 1 are sequentially fitted and accommodated in the external case 4 to be superimposed on the sound source unit 2 attached in the external case 4. In this state, the sound leading path 5 is surrounded and formed by the protruding portion 421 of the sidewall 42 and outer side portions of the backlight unit 2 and the liquid crystal display unit 1 on a corresponding side. The sound leading path 5 is provided in order to lead a sound wave generated from the front surface of the piezoelectric ceramic plate 31 when the plate 31 vibrates toward the front surface (a display surface) side of the liquid crystal display panel 11 from the opening portion 331 of the spacer 33. Therefore, a sound wave generated from the front surface of the piezoelectric ceramic plate 31 when this plate 31 vibrates in accordance with an input signal voltage advances through the sound leading path 5 from the opening portion 331 of the spacer 33, is propagated in this sound leading path 5 and discharged toward the display surface (the front surface) side of the liquid crystal display panel 11. As a result, a viewer of this liquid crystal display module can observe a picture displayed in the liquid crystal display panel 11 and listen to clear sound related to this picture.

As described above, according to the liquid crystal display module of this embodiment, the sound source unit 3 is superimposed and disposed on the rear surface (a back surface) side of the liquid crystal display unit 1 and the sound leading path 5 which leads a sound wave generated from this sound source unit 3 toward the front surface side of the liquid crystal display unit 1 is formed on the module side surface. Thus, it is possible to suppress an increase in an entire area of the liquid crystal display module caused due to provision of sound generating means, i.e., a speaker. As a result, a reduction in size and thickness can be achieved so that the liquid crystal display module with a speaker can be applied to, e.g., a mobile phone.

Further, in the sound source unit 3, the C-shaped spacer 33 and the circular spacer 34 formed of a buffer material are respectively disposed on opposite surfaces of the piezoelectric ceramic plate 31, and a sound wave generated from the surface having the circular spacer 33 disposed thereon in respective sound waves generated from both surfaces of the piezoelectric ceramic plate 31 can be selectively discharged toward the module front surface side from the spacer opening portion 331 through the sound leading path 5, thereby obtaining clear sound.

Furthermore, the thin holes 412 are formed in the external case 4 so that an unnecessary sound wave generated from the surface of the piezoelectric ceramic plate 31 having the circular spacer 34 disposed thereon can be dissipated, absorbed and eliminated in the space outside the module, thereby obtaining further clear sound.

Moreover, since the surface of the sound source signal input flexible wiring board 35 opposite to the wiring line formed surface is arranged to face the external case 4, a wiring line exposed portion such as a connection terminal 352a and 353a of each wiring line 352 and 353 can be suppressed from leaking to the external case 4 formed of a sheet metal as a conductor, and the connection terminals 352a and 353a can be prevented from being short-circuited, thus improving reliability as a display module.

Additionally, an increase in the number of components can be suppressed since the sound leading path 5 is surrounded and formed by the external case sidewall 42 and the side end surfaces of the liquid crystal display unit 1 and the backlight unit 2 without using a dedicated member or members, and component arrangement and design in a device in which the this liquid crystal display module is mounted can be facilitated and a mounting/assembling operation is also simplified to contribute to a reduction in the number of manufacturing steps since the sound source unit 3 is accommodated and integrated in the single external case 4 together with the liquid crystal display unit 1 or the backlight unit 2, thereby considerably promoting a decrease in cost of the flat liquid crystal display module according to this embodiment.

A second embodiment of the present invention will now be described with reference to FIGS. 4 and 5. It is to be noted that like reference numerals denote constituent elements equal to those in the foregoing embodiment, thereby omitting a description thereof.

Figure 4:
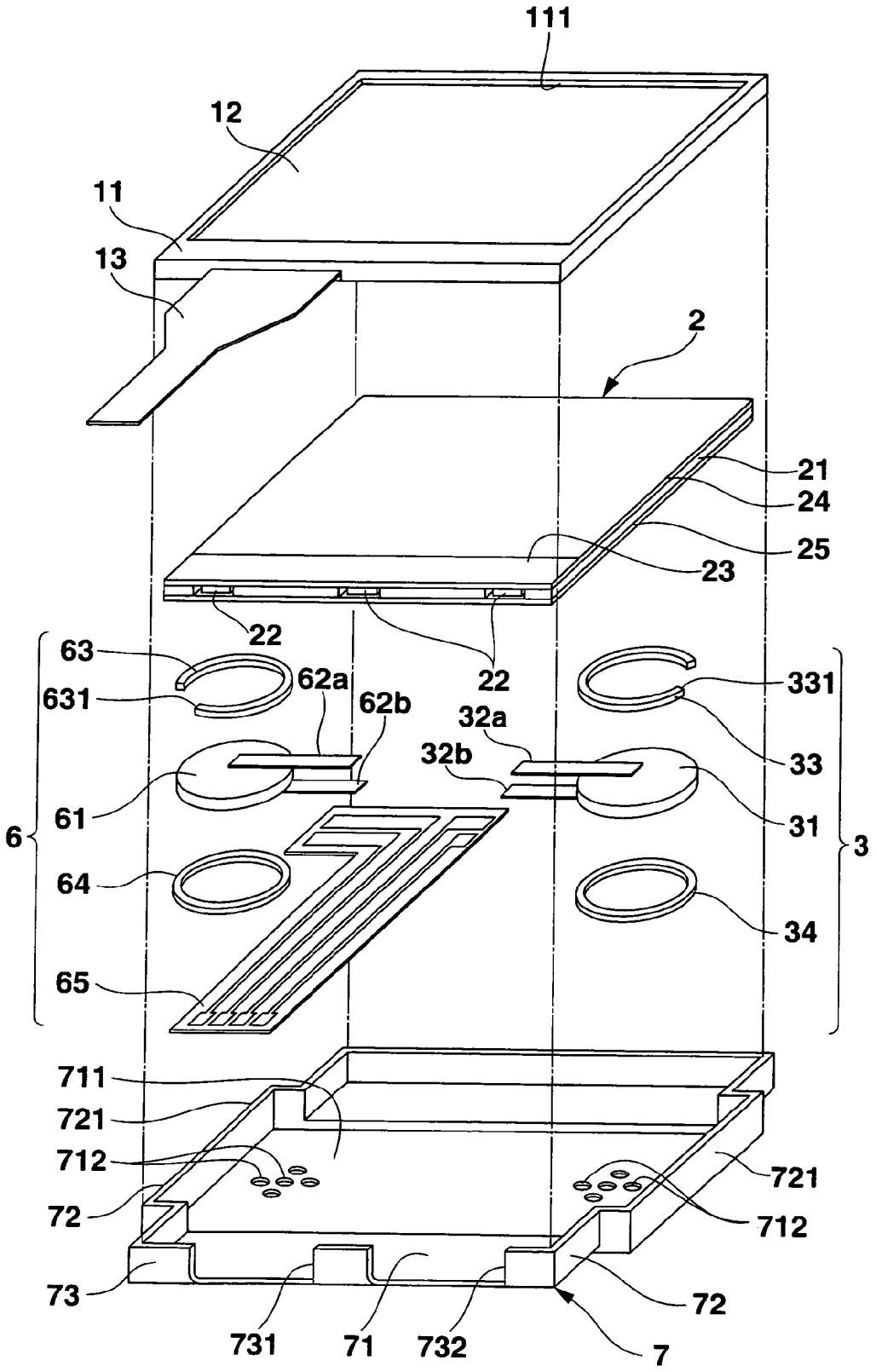
FIG. 4 is an exploded perspective view showing a liquid crystal display module as a second embodiment according to the present invention.
Figure 5:
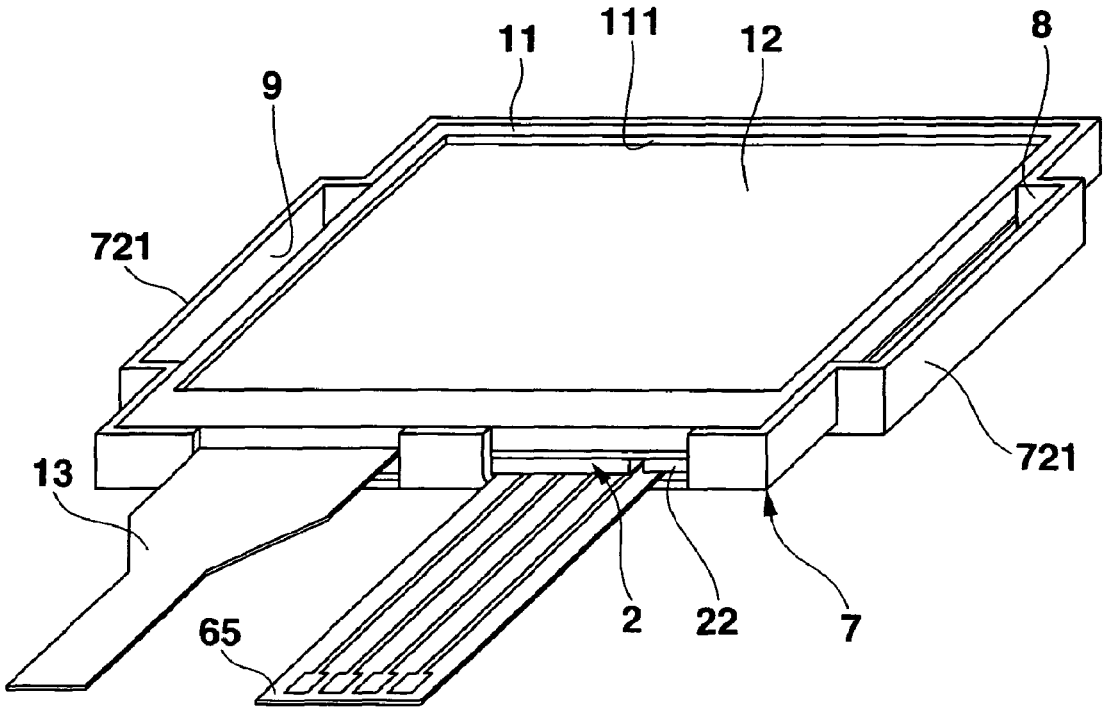
FIG. 5 is a perspective view showing the liquid crystal display module of the second embodiment.

As shown in FIG. 4, a liquid crystal display module according to this embodiment is a stereophonic sound type liquid crystal display module provided with a pair of sound source units 3 and 6. That is, the sound source unit 3 provided in the liquid crystal display module according to the foregoing embodiment and the sound source unit 6 having substantially the same structure are symmetrically arranged in relation to a central line which divides a longitudinal direction (a screen lateral direction) of a display surface of the liquid crystal display module into two.

In this case, a piezoelectric ceramic plate 61 having a pair of electrodes 62a and 62b which have the same structure being electrically conductive and attached thereon, a C-shaped spacer 63 and a circular spacer 64 having the same structure are respectively line-symmetrically arranged with respect to the central line in accordance with a piezoelectric ceramic plate 31 having a pair of electrodes 32a and 32b being electrically conductive and attached thereon and in accordance with a C-shaped spacer 33 and a circular spacer 34. The pair of electrodes 32a and 32b and the pair of electrodes 62a and 62b of the piezoelectric ceramic plates 31 and 61 are connected with corresponding electroconductive patterns of a common flexible wiring board 65 having the electroconductive patterns formed thereon.

Unnecessary sound wave dissipating hole groups obtained by cruciately arranging narrow holes 712 are respectively formed at symmetrical positions in a concave portion 711 of a bottom plate 71 of an external case 7, protruding portions 721 and 721 required to constitute sound leading paths are symmetrically formed on a pair of short sidewalls 72 and 72, and respective openings 731 and 732 from which a control signal input flexible wiring board 13 and a sound source signal input flexible wiring board 65 are pulled to the outside of the case 7 are provided in a longitudinal sidewall 73 one by one like the foregoing embodiment. As a result, as shown in FIG. 5, there can be obtained a stereophonic-sound-type liquid crystal display module with a speaker provided with a pair of sound leading paths 8 and 9 on left and right sides on the module display surface.

According to the thus configured flat liquid crystal display module as a modification, an effect that sounds can be clearly heard in a stereophonic mode can be demonstrated in addition to the same effect as that of the foregoing embodiment, i.e., a reduction in size and thickness of a device with a speaker having excellent reliability and clear sound.

The present invention is not restricted to the foregoing embodiments, and it can be constituted as follows, for example.

Figure 6:
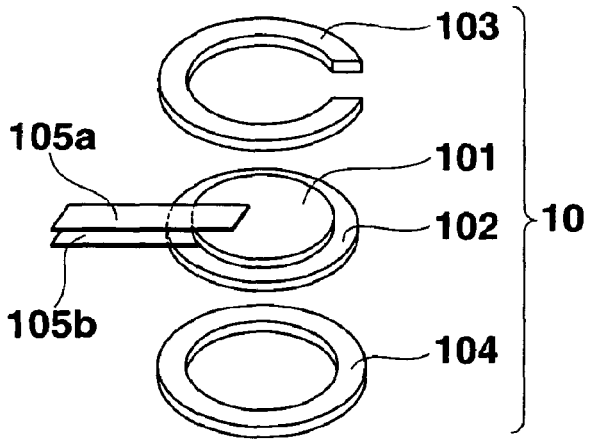
FIG. 6 is an exploded perspective view showing a modification of a sound source element.

Although the above has described as to the example of using the sound source element formed of the circular piezoelectric ceramic plate 31 or 61 and the pair of strip-like thin-film electrodes 32a and 32b or 62a and 62b which are electrically conductive and attached on both surfaces of this piezoelectric ceramic plate as the sound source unit 3 or 6 in the foregoing embodiments, the present invention is not restricted thereto, and it is possible to use a sound source element 10 formed of a piezoelectric vibrator having a piezoelectric element attached on at least one of surfaces of a film serving as a vibration plate. That is, as shown in FIG. 6, there is used a piezoelectric vibrator having a piezoelectric element 101 with a diameter smaller than that of the vibration plate 102 attached on one or both of surfaces of a circular vibration plate 101 consisting of a resin or a metal. Further, a C-shaped spacer 103 and a circular spacer 104 are arranged on the outside of an outer shape of the piezoelectric element 101 on the vibration plate 102, and the sound source element 10 is fixed in the case 4 or 7. According to this configuration, vibrations with a large amplitude caused by the vibration plate can be obtained, thereby generating sound with an intensive sound pressure.

Furthermore, although the notched portion for communication with the sound leading path is provided in the spacer arranged between the sound source element and the panel display in the spacers respectively arranged between the sound source element and the backlight unit and between the sound source element and the case in the foregoing embodiments, the present invention is not restricted thereto, and a notched portion for communication with the sound leading path may be provided in the spacer arranged between the sound source element and the case, or the notched portion may be provided in both the spacers arranged between the sound source element and the backlight unit and between the sound source element and the case. In this case, it is preferable to further provide a space in which a phase of a sound wave is inverted between the sound source element and the case.

Additionally, although the external case 4 or 7 is formed by processing a sheet metal material as a conductor in the foregoing embodiments, the present invention is not restricted thereto, and the external case may be molded and processed by using an insulating resin material. In this case, since the external case serves as an insulator, the terminals of the sound source signal input flexible wiring board are not short-circuited, and hence the electrode formed surface of the insulating base film in the flexible wiring board can be arranged to face the case, thus obtaining an advantage that a degree of freedom in design or arrangement of the flexible wiring board can be increased.

Further, the present invention is not restricted to the liquid crystal display module with a backlight, and it can be of course extensively applied to various kinds of flat panel display modules such as a reflection type liquid crystal display module, an organic electroluminescent (EL) display or a plasma display.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A flat panel display module comprising:

a flat panel display including a front surface situated on a display observation side, a rear surface and a plurality of outer side surfaces;

a sound source element arranged on a rear surface side of the panel display; and a main case including a plurality of sidewalls surrounding the outer side surfaces of the panel display and the sound source element, and a bottom plate facing the rear surface of the panel display, a part of at least one of the sidewalls and a part of at least one of the side surfaces facing the at least one sidewall defining a first space therebetween which opens on the display observation side;

wherein the display module defines a sound leading path including the first space [and either], a second space situated between the sound source element and the rear surface of the panel display [or], *and* a third space situated between the sound source element and the bottom plate of the main case, [at least] one of the second and third spaces communicating with the first space, [and the sound leading path enabling]

*wherein a first part of* a sound wave generated from the sound source element [to pass therethrough and] *passes through the one of the second and third spaces and the sound leading path to* be emitted from the main case *toward the display observation side, and*

*wherein a second part, which is different from the first part, of the sound wave generated from the sound source element passes through the other of the second and third spaces to be emitted from the main case toward an opposite side of the display observation side*.

2. The flat panel display module according to claim 1, further comprising a panel case in which the panel display is arranged, wherein the first space is formed by an outer side surface of the panel case and one of the sidewalls of the main case facing the outer side surface of the panel case.

3. The flat panel display module according to claim 2, wherein the sidewall of the main case defining the first space has a protruding portion which is separated from the outer side surface of the panel case to define the first space surrounded by the outer side surface of the panel case and an inner side surface of the protruding portion.

4. The flat panel display module according to claim 1, further comprising:

a backlight unit arranged between the panel display and the sound source element and which illuminates the panel display; and the sound leading path includes a space defined between an outer side surface of the backlight unit and the at least one sidewall of the main case.

5. The flat panel display module according to claim 4, further comprising a panel case which houses the panel display therein, and wherein the sidewall of the main case has a protruding portion which is separated from the outer side surface of the panel display to define the first space with the panel display, the sound leading path including a space formed by the outer side surface of the backlight unit and an inner side surface of the protruding portion.

6. The flat panel display module according to claim 5, wherein the protruding portion formed on the sidewall of the main case includes a protruding wall which forms an elongated rectangular shape bulging along the outer side surface of the panel display, when viewed from the display observation side.

7. The flat panel display module according to claim 1, wherein the sound source element includes a vibration element having a thin-plate shape which vibrates in response to a sound signal supplied thereto, further comprising a pair of the spacers which hold the vibration element by sandwiching rim portions of opposite surfaces of the vibration element.

8. The flat panel display module according to claim 7, wherein the spacers define the second and third spaces, one of the spacers is arranged between the vibration element and the rear surface of the panel display and the other spacer is arranged between the vibration element and the bottom plate of the main case, and at least one of the spacers includes a ring shaped spacer having a notched portion formed therein to enable the spacer to communicate with the first space.

9. The flat panel display module according to claim 1, further comprising:

a backlight unit arranged between the panel display and the sound source element and which illuminates the panel display; and a pair of spacers, one of the spacers being arranged between the sound source element and the backlight unit and the other spacer being arranged between the sound source element and the bottom plate of the main case, wherein the sound source element includes a vibration element having a thin-plate shape which vibrates in response to a sound signal supplied thereto and is arranged between the backlight unit and the bottom plate of the main case, rim portions of opposite surfaces of the vibration element being held by the spacers.

10. The flat panel display module according to claim 9, wherein at least one of the spacers includes a ring shaped spacer having a notched portion formed therein to enable the spacer to communicate with the first space.

11. The flat panel display module according to claim 1, wherein the sound source element includes a piezoelectric element having a thin-plate shape and a pair of electrodes which are electrically conductive and arranged on opposite surfaces of the piezoelectric element, the piezoelectric element vibrating in accordance with an applied voltage.

12. The flat panel display module according to claim 1, wherein the sound source element includes a vibration plate, a piezoelectric element arranged on at least one surface of the vibration plate and which vibrates in accordance with an applied voltage, and a pair of electrodes which are electrically conductive and connected on opposite surfaces of the piezoelectric element.

13. The flat panel display module according to claim 12, further comprising: a spacer which supports the vibration plate of the sound source element in the bottom plate of the main case.

14. The flat panel display module according to claim 12, further comprising a flexible wiring board which has a wiring pattern formed on a flexible base film surface made of a insulating resin material and supplies a signal voltage to the sound source element, wherein the flexible wiring board is arranged such that a rear surface of the base film faces a bottom inner surface of the case.

15. The flat panel display module according to claim 1, wherein the panel display includes a liquid crystal display panel having a liquid crystal held between a pair of substrates.

16. A flat panel display module comprising:

a flat panel display including a front surface situated on a display observation side, a rear surface and a plurality of outer side surfaces;

a backlight unit arranged on a rear surface side of the panel display apposite to the display observation side of the panel display and which illuminates the panel display;

a sound source element arranged on a rear surface side of the backlight unit; and a main case including a plurality of sidewalls surrounding the outer side surfaces of the panel display, the backlight unit and the sound source element, and a bottom plate facing the rear surface of the panel display, a part of at least one of the sidewalls and a part of at least one of the side surfaces facing the at least one sidewall defining a first space therebetween which opens on the display observation side;

wherein the display module defines a sound leading path including the first space [and either], a second space situated between the sound source element and the rear surface of the panel display [or], *and* a third space situated between the sound source element and the bottom plate of the main case, [at least] one of the second and third spaces communicating with the first space, [and the sound leading path enabling]

*wherein a first part of* a sound wave generated from the sound source element [to pass therethrough and] *passes through the one of the second and third spaces and the sound leading path to* be emitted from the main case *toward the display observation side, and*

*wherein a second part, which is different from the first part, of the sound wave generated from the sound source element passes through the other of the second and third spaces to be emitted from the main case toward an opposite side of the display observation side.*

17. The flat pane display module according to claim 16, further comprising a panel case which houses the panel display, and a protruding wall formed on the sidewall of the main case, the protruding wall protruding along the side surface of the panel display, when viewed from the display observation side, and forming an elongated rectangular space, and the first space includes a space defined between the side surfaces of the panel display and the backlight unit, and the protruding wall.

18. The flat panel display module according to claim 16, wherein the sound source element includes a vibration element having a thin-plate shape and which vibrates in response to a sound signal supplied thereto, and the display module further comprises:

a first spacer which is arranged along a circumference of one surface of the vibration element between the vibration element and the backlight unit and formed of an elastic body having a notched portion formed therein, the notched portion allowing communication with the sound leading path; and a second spacer which is arranged along a circumference of an opposite surface of the vibration element between the vibration element and the main case and supports the vibration element in the case.

19. A flat panel display module comprising:

a flat panel display including a front surface situated on a display observation side, a rear surface and a plurality of outer side surfaces;

at least first and second sound source elements arranged on a rear surface side of the panel display opposite to the display observation side of the panel display; and a main case including a plurality of sidewalls surrounding the outer side surfaces of the panel display and the first and second sound source elements, and a bottom plate facing the rear surface of the panel display, a part of a first one of the sidewalls and a part of a respective one of the side surfaces facing the first sidewall defining a first space therebetween which opens on the display observation side and a part of a second one of the sidewalls opposite the first sidewall and a part of a respective one of the side surfaces facing the second sidewall defining a second space therebetween which opens on the display observation side;

wherein the display module defines a first sound leading path including the first space and either a third space situated between the first sound source element and the rear surface of the panel display or a fourth space situated between the first sound source element and the bottom plate of the main case, at least one of the third and fourth spaces communicating with the first space, and the first sound leading path enabling a sound wave generated from the first sound source element to pass therethrough and be emitted from the main case; and wherein the display module further defines a second sound leading path including the second space and either a fifth space situated between the second sound source element and the rear surface of the panel display or a sixth space situated between the second sound source element and the bottom plate of the main case, at least one of the fifth and sixth spaces communicating with the second space, and the second sound leading path enabling a sound wave generated from the second sound source element to pass therethrough and be emitted from the main case.

20. The flat panel display module according to claim 19, further comprising:

a panel case for housing the panel display;

a backlight unit arranged between the panel display and the first and second sound source elements and which illuminates the panel display;

at least two first spacers, each of which is formed of an elastic body, arranged along a rim portion of one surface of each of the first and second sound source elements between the respective sound source element and the backlight unit and has notched portion formed therein, the notched portion allowing communication with the first or second sound leading path; and at least two second spacers, each of which is arranged along a rim portion of an opposite surface of each of the first and second sound source elements between the sound source element and the main case and supports the sound source element in the main case.

*21. The flat panel display module according to claim 16, wherein the sound source element comprises a piezoelectric ceramic plate;*

*wherein the sound source element is arranged between the bottom plate of the main case and the backlight unit; and*

*wherein the flat plan display module comprises a C shaped ring spacer which is arranged between the piezoelectric ceramic plate and the backlight unit, and includes a*

*notch formed therein that communicates with the sound leading path, the C shaped ring spacer defining the one of the second and third spaces communicating with the first space.*

*22. The flat panel display module according to claim 21, wherein the C shaped ring spacer has first and second opposite main surfaces which are respectively positioned adjacent to the backlight unit and the piezoelectric ceramic plate, and wherein an entire area of the first main surface is covered by the panel display or the backlight unit.*

*23. The flat panel display module according to claim 21, wherein the C-shaped ring spacer has first and second opposite main surfaces which are respectively positioned adjacent to the backlight unit and the piezoelectric ceramic plate, and wherein the first main surface contacts the backlight unit, and the second main surface contacts the piezoelectric ceramic plate.*

*24. The flat panel display module according to claim 23, wherein the backlight unit comprises:*

*a light source for emitting light, the light source comprising an LED;*

*a light guide plate for guiding therein the light emitted by the light source, the light being incident from one end side of the light guide plate; and*

*a light reflecting member facing the light guide plate for reflecting the light going out from the light guide plate into the light guide plate; and*

*wherein the first main surface of the C-shaped ring spacer contacts the light reflecting member of the backlight unit.*

*25. The flat panel display module according to claim 21, wherein the flat panel display module further comprises a circular ring spacer which is arranged between the piezoelectric ceramic plate and the bottom plate of the main case, the circular ring spacer defining the other of the second and third spaces.*

*26. The flat panel display module according to claim 25, wherein the circular ring spacer has first and second opposite main surfaces which are respectively positioned adjacent to the piezoelectric ceramic plate and the bottom plate of the main case, and wherein the first main surface contacts the piezoelectric ceramic plate, and the second main surface contacts the bottom plate of the main case.*

*27. The flat panel display module according to claim 25, wherein the bottom plate of the main case has a plurality of through holes in a region enclosed by the circular ring spacer.*

*28. The flat panel display module according to claim 1, wherein the sound source element comprises a piezoelectric ceramic plate;*

*wherein the sound source element is arranged between the bottom plate of the main case and the backlight unit; and*

*wherein the flat panel display module further comprises a C shaped ring spacer which is arranged between the piezoelectric ceramic plate and the panel display, and includes at least one notch formed therein that communicates with the sound leading path, the C shaped ring spacer defining the one of the second and third spaces communicating with the first space.*

*29. The flat panel display module according to claim 28, the flat panel display module further comprises a circular ring spacer which is arranged between the piezoelectric ceramic plate and the bottom plate of the main case, the circular ring spacer defining the other of the second and third spaces; and*

*wherein the circular ring spacer has first and second opposite main surfaces which are respectively positioned adjacent to the piezoelectric ceramic plate and the bottom plate of the main case, and wherein the first main surface contacts the piezoelectric ceramic plate, and the second main surface contacts the bottom plate of the main case.*

*30. The flat panel display module according to claim 19, wherein the first sound source element comprises a first piezoelectric ceramic plate;*

*wherein the second sound source element comprises a second piezoelectric ceramic plate; and*

*wherein the flat panel display module further comprises a first C shaped ring spacer which is arranged between the first piezoelectric ceramic plate and the panel display, and includes a first notch formed therein that communicates with the first sound leading path, the first C shaped ring spacer defining the one of the third and fourth spaces communicating with the first space; and*

*wherein the flat panel display module further comprises a second C shaped ring spacer which is arranged between the second piezoelectric ceramic plate and the panel display, and includes a second notch formed therein that communicates with the second sound leading path, the first C shaped ring spacer defining the one of the fifth and sixth spaces communicating with the second space.*

*31. The flat panel display module according to claim 30, wherein the first sound source element is positioned nearer to the first sound leading path than the second sound source element is, and the second sound source element is positioned nearer to the second sound leading path than the first source sound element is.*

*32. The flat panel display module according to claim 30, wherein the flat panel display module further comprises a first circular ring spacer which is arranged between the first piezoelectric ceramic plate and the bottom plate of the main case, the first circular ring spacer defining the other of the third and fourth spaces;*

*wherein the first circular ring spacer has first and second opposite main surfaces which are respectively positioned adjacent to the first piezoelectric ceramic plate and the bottom plate of the main, and wherein the first main surface contacts the first piezoelectric ceramic plate, and the second main surface contacts the bottom plate of the main case;*

*wherein the flat panel display module further comprises a second circular ring spacer which is arranged between the second piezoelectric ceramic plate and the bottom plate of the main case, the first circular ring spacer defining the other of the fifth and sixth spaces; and*

*wherein the second circular ring spacer has first and second opposite main surfaces which are respectively positioned adjacent to the second piezoelectric ceramic plate and the bottom plate of the main case, and wherein the first main surface contacts the second piezoelectric ceramic plate, and the second main surface contacts the bottom plate of the main case.*

*33. The flat panel display module according to claim 30, wherein the first and second sound source elements are symmetrically arranged in relation to a central axis of the flat panel display module.*

*34. The flat panel display module according to claim 1, wherein the sound source element comprises a vibration plate;*

*wherein the sound source element is arranged between the display panel and the bottom plate of the main case; and*

*wherein the flat panel display module further comprises a frame like spacer which is arranged between the vibration plate and the display panel, and includes a notch formed therein that faces the sound leading path, the*

*frame like spacer defining the one of the second and third spaces that communicates with the first space.*

*35. The flat panel display module according to claim 19, wherein the first sound source element comprises a first vibration;*

*wherein the second sound source element comprising a second vibration plate;*

*wherein the flat panel display module further comprises a first frame like spacer which is arranged between the first vibration plate and the display panel, and includes a first notch formed that faces the first sound leading path, the first frame like spacer defining the one of the third and fourth spaces that communicates with the first space; and*

*wherein the flat panel display module further comprises a second frame like spacer which is arranged between the second vibration plate and the display panel, and includes a second notch formed that faces the second sound leading path, the second frame like spacer defining the one of the fifth and sixth spaces that communicates with the second space.*

*36. The flat panel display module according to claim 35, wherein the first sound source element is positioned nearer to the first sound leading path than the second sound source element is, and the second sound source element is positioned nearer to the second sound leading path than the first sound source element is.*

*37. The flat panel display module according to claim 35, wherein the first and second sound source elements are symmetrically arranged in relation to a central axis of the flat panel display module.*

* * * * *